(12) United States Patent
Akashi et al.

(10) Patent No.: US 10,975,935 B2
(45) Date of Patent: Apr. 13, 2021

(54) DUAL CLUTCH-TYPE TRANSMISSION

(71) Applicant: ISUZU MOTORS LIMITED, Tokyo (JP)

(72) Inventors: Kouhei Akashi, Yokohama (JP); Takefumi Okamoto, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 69 days.

(21) Appl. No.: 16/461,582

(22) PCT Filed: Nov. 17, 2017

(86) PCT No.: PCT/JP2017/041425
§ 371 (c)(1),
(2) Date: May 16, 2019

(87) PCT Pub. No.: WO2018/092871
PCT Pub. Date: May 24, 2018

(65) Prior Publication Data
US 2019/0368578 A1    Dec. 5, 2019

(30) Foreign Application Priority Data

Nov. 18, 2016 (JP) .............................. JP2016-225401

(51) Int. Cl.
*F16H 3/08* (2006.01)
*F16H 3/00* (2006.01)
(Continued)

(52) U.S. Cl.
CPC ............. *F16H 3/006* (2013.01); *F16H 3/097* (2013.01); *F16H 2003/0933* (2013.01)

(58) Field of Classification Search
CPC .. F16H 3/006; F16H 3/097; F16H 2003/0933; F16H 3/08
(Continued)

(56) References Cited

U.S. PATENT DOCUMENTS 7,377,191 B2 * 5/2008 Gitt .......................... F16H 3/006
74/330
2006/0169077 A1 8/2006 Gitt
(Continued)

FOREIGN PATENT DOCUMENTS

DE       102010004954 A1    7/2011
DE    10 2012 202 492    *    8/2013
(Continued)

OTHER PUBLICATIONS

International Search Report and Written Opinion for related International Application No. PCT/JP2017/041425, dated Jan. 23, 2018; English translation of ISR provided; 9 pages.

*Primary Examiner* — William C Joyce
(74) *Attorney, Agent, or Firm* — Procopio, Cory, Hargreaves & Savitch LLP (57) ABSTRACT

A dual clutch-type transmission includes a first clutch, a second clutch, a first input shaft, a second input shaft, an output shaft, a first countershaft, a second countershaft, a first input gear train, a second input gear train, a first output gear train, a second output gear train, a third output gear train, a first synchronization mechanism, a second synchronization mechanism, and a third synchronization mechanism.

2 Claims, 10 Drawing Sheets

(51) Int. Cl.
*F16H 3/097* (2006.01)
*F16H 3/093* (2006.01)

(58) Field of Classification Search
USPC .......................................................... 74/331
See application file for complete search history.

(56) References Cited

U.S. PATENT DOCUMENTS

2010/0162840 A1   7/2010  Gitt
2015/0072831 A1   3/2015  Sakata

FOREIGN PATENT DOCUMENTS

| DE | 10 2013 04 777 | * | 9/2014 |
| DE | 102013218519 A1 | | 3/2015 |
| DE | 10 2014 218 104 | * | 3/2016 |
| JP | 2007-503559 A | | 2/2007 |
| JP | 2010-531417 A | | 9/2010 |
| JP | 2010-535990 A | | 11/2010 |
| JP | 2013-213537 A | | 10/2013 |
| WO | 2016-174202 A1 | | 11/2016 |

* cited by examiner

DUAL CLUTCH-TYPE TRANSMISSION

CROSS-REFERENCE TO RELATED APPLICATIONS

This application is a U.S. National Stage entry of PCT Application No: PCT/JP2017/041425 filed on Nov. 17, 2017, which claims priority to Japanese Patent Application No. 2016-225401, filed Nov. 18, 2016, the contents of which are incorporated herein by reference.

TECHNICAL FIELD

The present disclosure relates to a dual clutch-type transmission.

BACKGROUND ART

In recent years, a dual clutch-type transmission having two clutches has been known. A general dual clutch-type transmission has power transmission mechanisms of two systems including odd-numbered stages and even-numbered stages corresponding to respective clutches and is configured to perform shifting while alternately connecting each system.

For example, Patent Literature 1 discloses a technology where a second countershaft of a hollow-shaft shape through which a first countershaft is inserted is integrally formed with two counter gears separated from each other and a power transmission path is switched from the first countershaft to the second countershaft at a sixth speed, and further two primary gear trains corresponding to respective clutches are re-used as gear trains for transmission, in such a manner that a total of six speeds are achieved while preventing an increase in the number of gears.

CITATION LIST

Patent Literature

[Patent Literature 1]: JP-T-2010-531417

SUMMARY

Technical Problem

In a structure described in Patent Literature 1 described above, it is necessary to add two transmission gear trains when a transmission stage is increased from six speeds to eight speeds, resulting in an increase in an overall length and weight of a transmission.

Further, in the structure described in Patent Literature 1 described above, a fourth-speed output main gear, which is constantly meshed with a fourth-speed counter gear rotatably provided on a countershaft, is fixed to an output shaft. Therefore, the fourth-speed counter gear oil-immersed in lubricating oil is constantly accelerated and rotated by the fourth-speed output main gear. As a result, there is a problem in that stirring resistance is increased. In addition, a relative rotational speed of a dog gear with respect to a synchronizer ring is increased, which causes heat generation, wear, and an increase in drag loss on the friction surface between the synchronizer ring and the dog gear.

According to a technology of the present disclosure effectively prevents an increase in an overall length and weight of a transmission by achieving a multi-stage transmission configuration while saving the number of transmission gear trains.

Solution to Problem

According to a technology of the present disclosure, there is provided a dual clutch-type transmission including a first input shaft, which includes a first clutch to connect and disconnect power from a driving source; a second input shaft, which includes a second clutch to connect and disconnect power from the driving source and has a hollow-shaft shape such that the first input shaft is rotatably inserted; an output shaft, which is coaxially arranged with the first input shaft; a first countershaft, which is arranged parallel to the first input shaft, the second input shaft and the output shaft; a second countershaft, which has a hollow-shaft shape such that the first countershaft is rotatably inserted; a first input gear train, which includes a first input main gear fixed to the second input shaft and a first input counter gear fixed to the first countershaft and meshing with the first input main gear; a second input gear train, which includes a second input main gear fixed closer to the output side than the second input shaft in the first input shaft and a second input counter gear fixed to the second countershaft and meshing with the second input main gear; a first output gear train, which includes a first output main gear rotatably provided on the output shaft and a first output counter gear fixed closer to the output side than the second input main gear in the second countershaft and meshing with the first output main gear; a second output gear train, which includes a second output main gear rotatably provided closer to the output side than the first output main gear in the output shaft and a second output counter gear fixed closer to the output side than the first output counter gear in the second countershaft and meshing with the second output main gear; a third output gear train, which includes a third output main gear rotatably provided closer to the output side than the second output main gear in the output shaft and a third output counter gear fixed closer to the output side than the second countershaft in the first countershaft and meshing with the third output main gear; a first synchronization mechanism which selectively synchronously couples the second input counter gear with the first countershaft; a second synchronization mechanism, which synchronously couples the second input main gear and the first output main gear with the output shaft, selectively; and a third synchronization mechanism, which synchronously couples the second output main gear and the third output main gear with the output shaft, selectively. The power of the driving source is transmitted to the output shaft via the second clutch, the second input shaft, the first input gear train, the first countershaft, the first synchronization mechanism, the second input gear train, and the second synchronization mechanism at a predetermined maximum speed stage.

The first output gear train, the second output gear train, and the third output gear train may be shared as an output gear train of a predetermined speed stage and a speed stage which is one step higher than said speed stage, by switching the first clutch and the second clutch.

Further, the predetermined maximum speed stage may be an eighth speed, the third output gear train may be an output gear train shared by a first speed and a second speed, the first output gear train may be an output gear train shared by a third speed and a fourth speed, the second output gear train may be an output gear train shared by a fifth speed and a sixth speed, and in a seventh speed, the power of the driving source may be transmitted to the output shaft via the first clutch, the first input shaft, the second input main gear, and the second synchronization mechanism.

The dual clutch-type transmission may include a reverse input gear train including a reverse input gear train including: a reverse input main gear fixed closer to the input side than the second input main gear in the first input shaft; a reverse input counter gear that is rotatably provided between the first input counter gear of the first countershaft and the first synchronization mechanism and is synchronously coupled with the first countershaft, selectively, by the first synchronization mechanism; and an idler gear meshing with the reverse input main gear and the reverse input counter gear. In a reverse stage, the power of the drive source may be transmitted to the output shaft via the first clutch, the first input shaft, the reverse input gear train, the first synchronization mechanism, the first countershaft, a third output gear train, and the third synchronization mechanism.

Advantageous Effects of Invention

According to the technology of the present disclosure, an increase in an overall length and weight of a transmission can be effectively prevented by achieving a multi-stage transmission configuration while saving the number of transmission gear trains.

DESCRIPTION OF EMBODIMENTS

Hereinafter, a dual clutch-type transmission according to an embodiment of the present disclosure will be described based on the accompanying drawings. The same components are given the same reference signs and names and functions thereof are also the same. Therefore, the detailed descriptions thereof will not be repeated.

Figure 1:
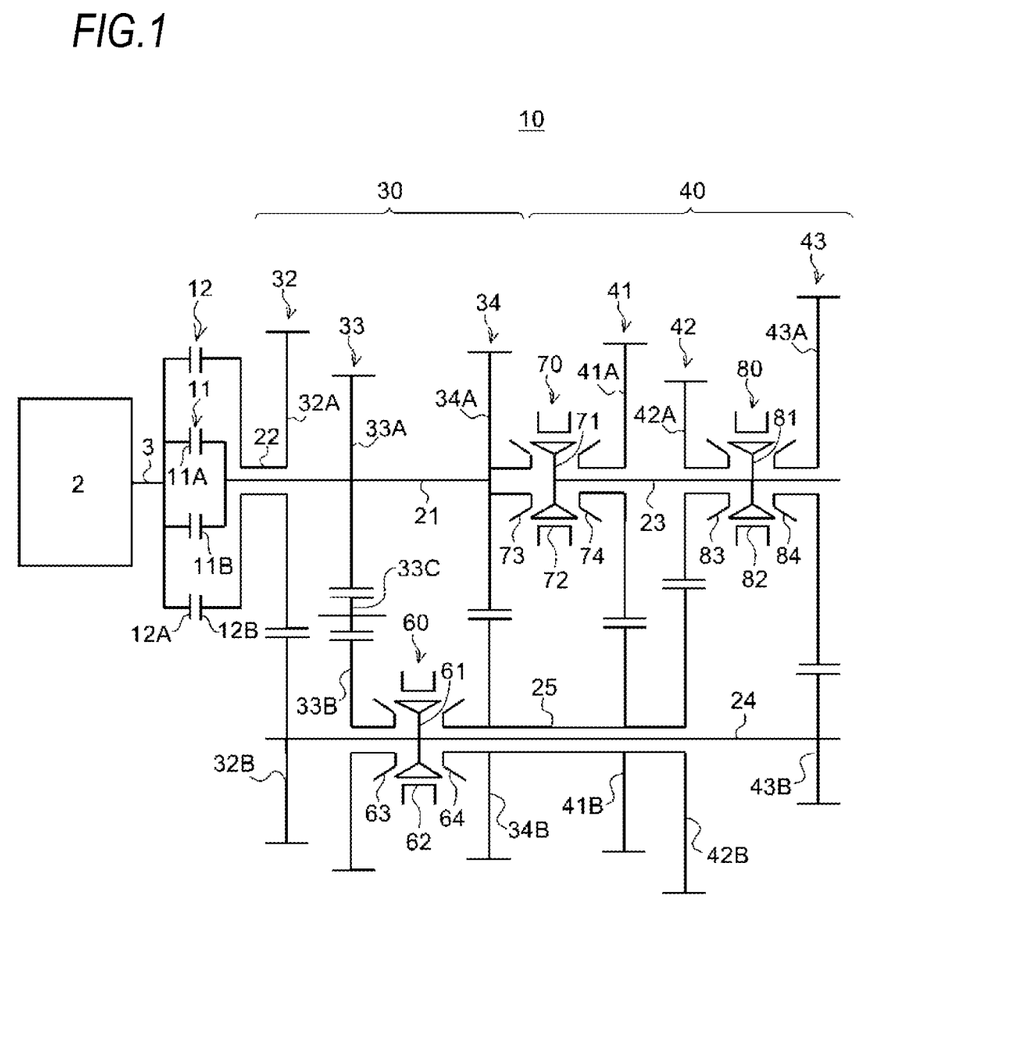
FIG. 1 is a schematic overall configuration diagram illustrating a dual clutch-type transmission according to an embodiment.

A dual clutch-type transmission 10 illustrated in FIG. 1 is mounted on a vehicle or the like. Specifically, the operation of the dual clutch-type transmission 10 is controlled by a control unit (not illustrated) and the dual clutch-type transmission 10 includes a first clutch 11, a second clutch 12, a first input shaft 21, a second input shaft 22, an output shaft 23, a first countershaft 24, a second countershaft 25, a primary transmission mechanism 30, and a secondary transmission mechanism 40.

The first clutch 11 is, for example, a wet multi-plate clutch and includes a plurality of first pressure plates 11A which are provided to be integrally rotatable on a crankshaft 3 of an engine 2, and a plurality of first clutch disks 11B which are provided to be integrally rotatable at an input end of the first input shaft 21. When the first pressure plates 11A move and come into pressure-contact with the first clutch disks 11B, the power of the engine 2 is transmitted to the first input shaft 21 through the first clutch 11.

The second clutch 12 is, for example, a wet multi-plate clutch and includes a plurality of second pressure plates 12A which are provided to be integrally rotatable on the crankshaft 3 of an engine 2 and a plurality of second clutch disks 12B which are provided to be integrally rotatable at an input end of the second input shaft 22. When the second pressure plates 12A move and come into pressure-contact with the second clutch disks 12B, the power of the engine 2 is transmitted to the second input shaft 22 through the second clutch 11.

The first input shaft 21 is rotatably supported via a bearing on a transmission case or the like (not illustrated). The second input shaft 22 is a hollow shaft through which the first input shaft 21 is inserted and is supported to be relatively rotatable with respect to the first input shaft 21 via a bearing or the like (not illustrated).

The output shaft 23 is disposed coaxially with the first and second input shafts 21 and 22 at a distance from an output end of the first input shaft 21 and rotatably supported via a bearing on the transmission case or the like (not illustrated). The first countershaft 24 is disposed in parallel at a distance from the input shafts 21 and 22 and the output shaft 23 and rotatably supported via a bearing on the transmission case or the like (not illustrated). The second countershaft 25 is a hollow shaft through which the first countershaft 24 is inserted and is supported to be relatively rotatable to the first countershaft 24 via a bearing or the like (not illustrated).

The primary transmission mechanism 30 includes a first input gear train 32, a reverse input gear train 33, a second input gear train 34, and a first synchronization mechanism 60.

The first input gear train 32 is a high-speed input gear train and includes a first input main gear 32A which is provided to be integrally rotatable on the second input shaft 22 and a first input counter gear 32B which is provided to be integrally rotatable on the first countershaft 24 and constantly meshes with the first input main gear 32A.

The reverse input gear train 33 includes a reverse main gear 33A which is provided to be integrally rotatable on the first input shaft 21, a reverse counter gear 33B which is provided to relatively rotatable to the first countershaft 24, and an idler gear 33C which constantly meshes with respective gears 33A and 33B.

The second input gear train 34 is a low speed input gear train and includes a second input main gear 34A which is provided to be integrally rotatable on the first input shaft 21 and a second input counter gear 34B which is provided to be integrally rotatable on the second countershaft 25 and constantly meshes with the second input main gear 34A.

The first synchronization mechanism 60 includes a first synchronization hub 61 which is provided to be integrally rotatable on the first countershaft 24 between the reverse counter gear 33B and the second input counter gear 34B, a first synchronization sleeve 62 which has inner peripheral teeth meshing with outer peripheral teeth of the first synchronization hub 61, a reverse dog gear 63 which is provided to be integrally rotatable on the reverse counter gear 33B, a second input dog gear 64 which is provided to be integrally rotatable on the second input counter gear 34B, and synchronizer rings (not illustrated) which are respectively provided between the first synchronization hub 61 and the dog gears 63 and 64.

In the first synchronization mechanism 60, the first synchronization sleeve 62 is shifted by a shift fork (not illustrated) and engaged with the dog gear 63 or 64 to selectively synchronously couple (gear in) the counter gear 33B or 34B to the first countershaft 24.

The secondary transmission mechanism 40 includes a third-speed/fourth-speed output gear train 41, a fifth-speed/sixth-speed output gear train 42, a first-speed/second-speed/reverse output gear train 43, a second synchronization mechanism 70, and a third synchronization mechanism 80.

The third-speed/fourth-speed output gear train 41 is an example of the first output gear train of the present disclosure and includes a third-speed/fourth-speed output main gear 41A which is provided to be relatively rotatable to the output shaft 23 and a third-speed/fourth-speed output counter gear 41B which is provided to be integrally rotatable on the second countershaft 25 and constantly meshes with the third-speed/fourth-speed output main gear 41A.

The fifth-speed/sixth-speed output gear train 42 is an example of the second output gear train of the present disclosure and includes a fifth-speed/sixth-speed output main gear 42A which is provided to be relatively rotatable to the output shaft 23 and a fifth-speed/sixth-speed output counter gear 42B which is provided to be integrally rotatable on the second countershaft 25 and constantly meshes with the fifth-speed/sixth-speed output main gear 42A.

The first-speed/second-speed/reverse output gear train 43 is an example of the third output gear train of the present disclosure and includes a first-speed/second-speed/reverse output main gear 43A which is provided to be relatively rotatable to the output shaft 23 and a first-speed/second-speed/reverse output counter gear 43B which constantly meshes with the first-speed/second-speed/reverse output main gear 43A.

The second synchronization mechanism 70 includes a second synchronization hub 71 which is provided to be integrally rotatable on the output shaft 23 (the input end of the output shaft 23) between the second input main gear 34A and the third-speed/fourth-speed output main gear 41A, a second synchronization sleeve 72 which includes inner peripheral teeth meshing with outer peripheral teeth of the second synchronization hub 71, a seventh-speed dog gear 73 which is provided to be integrally rotatable on the second input main gear 34A, a third-speed/fourth-speed dog gear 74 which is provided integrally rotatably on the third-speed/fourth-speed output main gear 41A, and synchronizer rings (not illustrated) which is respectively provided between the second synchronization hub 71 and the respective dog gears 73 and 74.

In the second synchronization mechanism 70, the second synchronization sleeve 72 is shifted by a shift fork (not illustrated) and engaged with the dog gear 73 or 74 to selectively synchronously couple (gear in) the second input main gear 34A or the third-speed/fourth-speed output main gear 41A to the output shaft 23.

The third synchronization mechanism 80 includes a third synchronization hub 81 which is provided to be integrally rotatable on the output shaft 23 between the fifth-speed/sixth-speed output main gear 42A and the first-speed/second-speed/reverse output main gear 43A, a third synchronization sleeve 82 which has inner peripheral teeth meshing with outer peripheral teeth of the third synchronization hub 81, a fifth-speed/sixth-speed dog gear 83 which is provided to be integrally rotatable on the fifth-speed/sixth-speed output main gear 42A, a first-speed/second-speed/reverse dog gear 84 which is provided to be integrally rotatable on the first-speed/second-speed/reverse output main gear 43A, and synchronizer rings (not illustrated) which are respectively provided between the third synchronization hub 81 and the respective dog gears 83 and 84.

In the third synchronization mechanism 80, the third synchronization sleeve 82 is shifted by a shift fork (not illustrated) and engaged with the dog gear 83 or 84 to selectively synchronously couple (gear in) the fifth-speed/sixth-speed output main gear 42A or the first-speed/second-speed/reverse output main gear 43A to the output shaft 23.

Next, the power transmission path of each speed by dual clutch-type transmission 10 of the embodiment will be described based on FIGS. 2 to 10.

Figure 2:
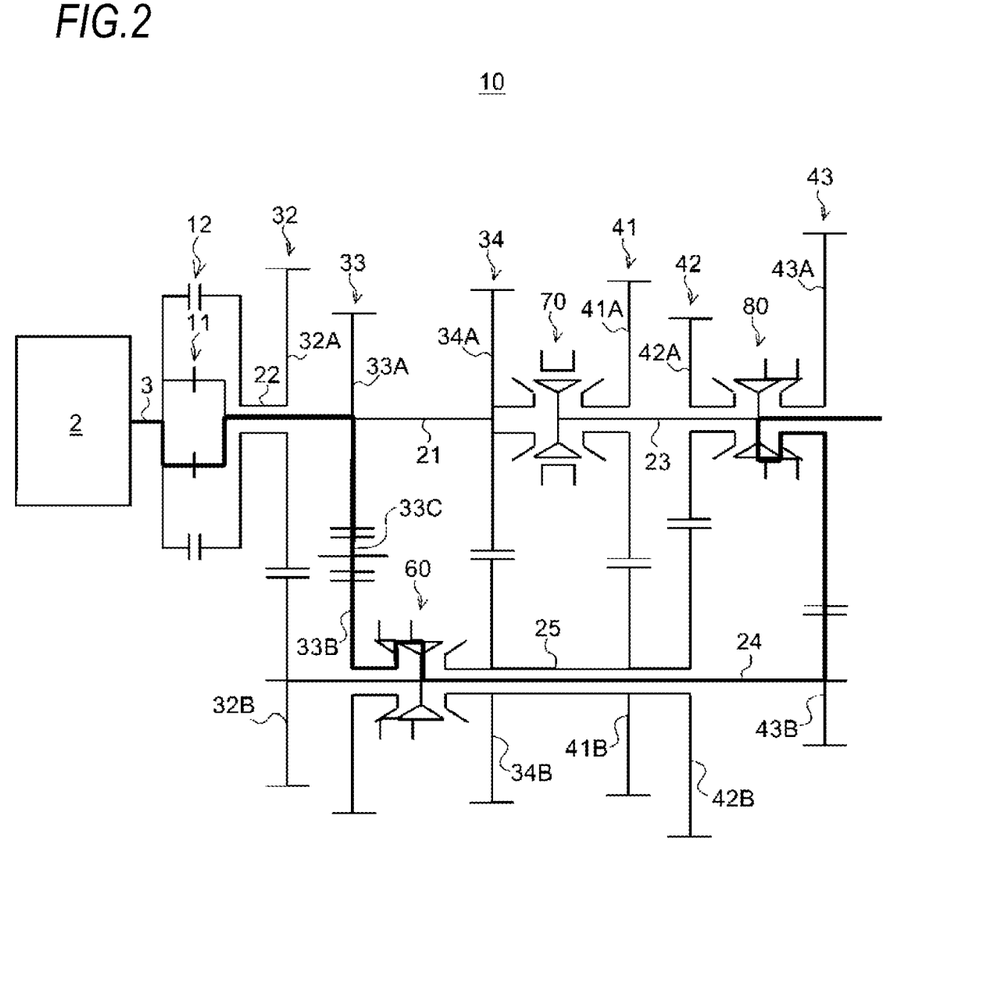
FIG. 2 is a diagram for illustrating a power transmission path of the reverse of the dual clutch-type transmission according to the embodiment.

FIG. 2 illustrates the power transmission path of the reverse stage. In the case of the reverse, the first clutch 11 is selected and the reverse counter gear 33B and the first countershaft 24 are coupled by the first synchronization mechanism 60. Further, the first-speed/second-speed/reverse output main gear 43A and the output shaft 23 are coupled by the third synchronization mechanism 80. That is, the power of the engine 2 is transmitted in order of the first clutch 11, the first input shaft 21, the reverse input gear train 33, the first synchronization mechanism 60, the first countershaft 24, the first-speed/second-speed/reverse output gear train 43, the third synchronization mechanism 80, and the output shaft 23, whereby the power transmission path of the reverse stage is established.

Figure 3:
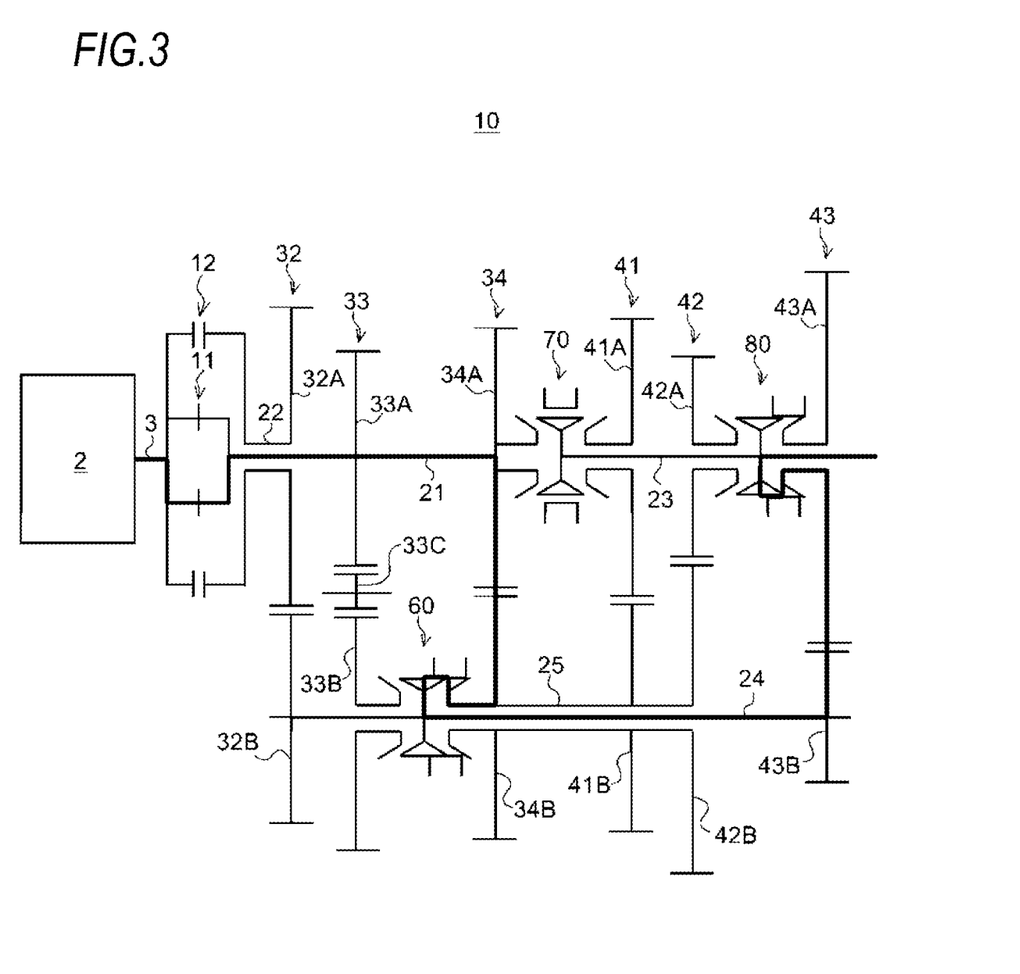
FIG. 3 is a diagram for illustrating a power transmission path at a first speed of the dual clutch-type transmission according to the embodiment.

FIG. 3 illustrates the power transmission path of the first-speed stage. In the case of the first speed, the first clutch 11 is selected and the second input counter gear 34B and the first countershaft 24 are coupled by the first synchronization mechanism 60. Further, the first-speed/second-speed/reverse output main gear 43A and the output shaft 23 are coupled by the third synchronization mechanism 80. That is, the power of the engine 2 is transmitted in order of the first clutch 11, the first input shaft 21, the second input gear train 34, the first synchronization mechanism 60, the first countershaft 24, the first-speed/second-speed/reverse output gear train 43, the third synchronization mechanism 80, and the output shaft 23, whereby the power transmission path of the first-speed stage is established.

Figure 4:
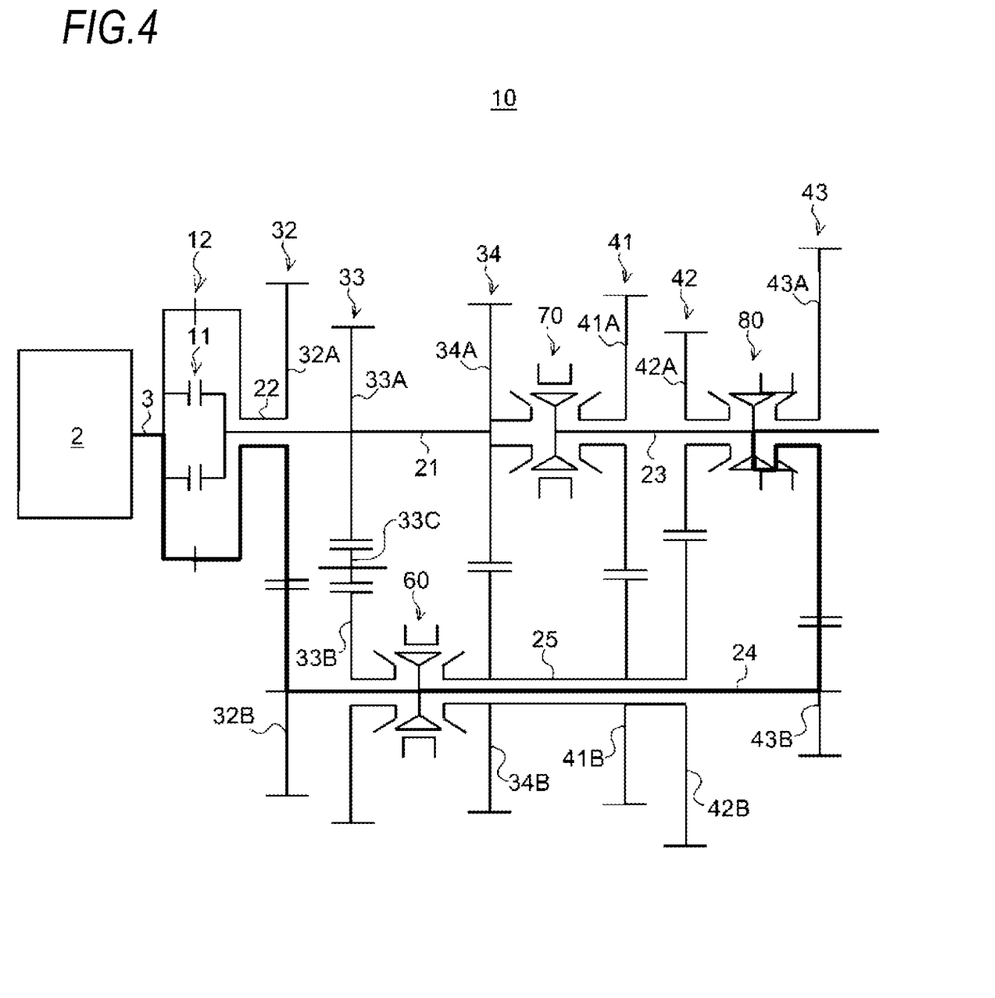
FIG. 4 is a diagram for illustrating a power transmission path at a second speed of the dual clutch-type transmission according to the embodiment.

FIG. 4 illustrates the power transmission path of the second-speed gear. The second speed is realized by switching the clutch connection from the first clutch 11 to the second clutch 12 in the first-speed state. That is, the power of the engine 2 is transmitted in order of the second clutch 12, the second input shaft 22, the first input gear train 32, the first countershaft 24, the first-speed/second-speed/reverse output gear train 43, the third synchronization mechanism 80, and the output shaft 23, whereby the power transmission path of the second-speed stage is established.

Figure 5:
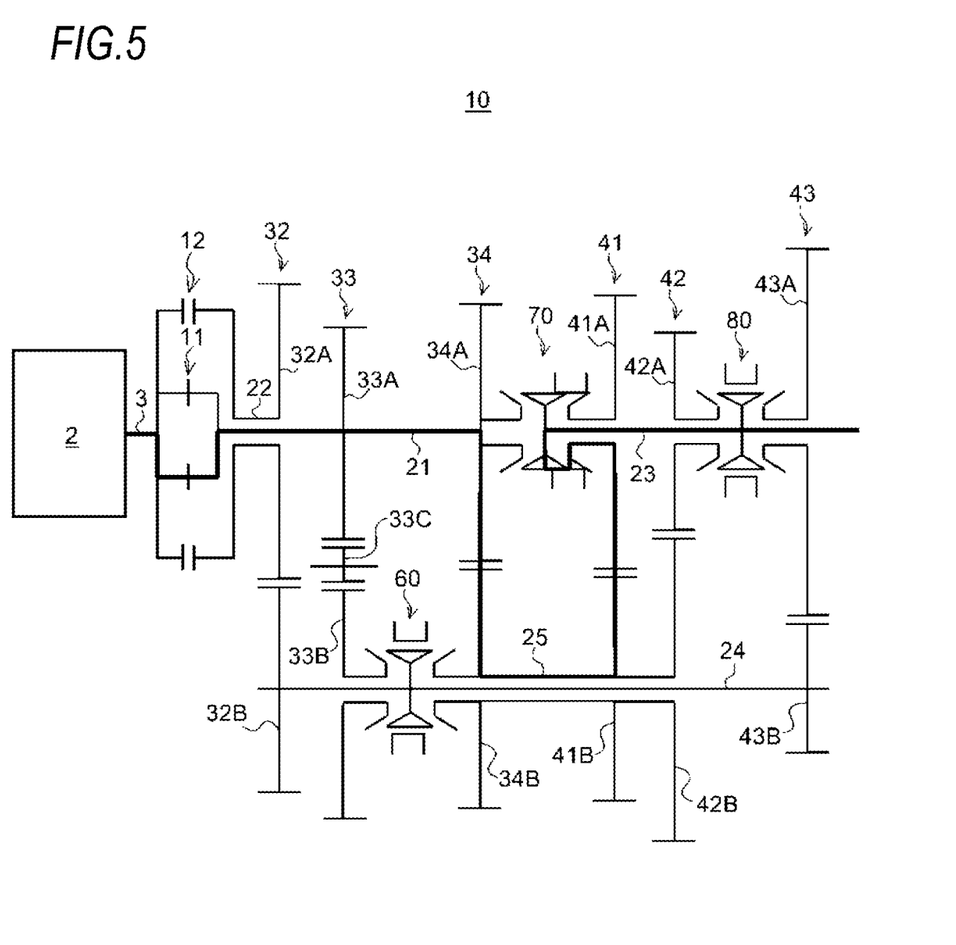
FIG. 5 is a diagram for illustrating a power transmission path at a third speed of the dual clutch-type transmission according to the embodiment.

FIG. 5 illustrates the power transmission path of the third-speed stage. The third speed is realized by coupling the third-speed/fourth-speed output main gear 41A and the output shaft 23 by the second synchronization mechanism 70 to pre-shift the second-speed state to the third speed, and then switching the clutch connection from the second clutch 12 to the first clutch 11. That is, the power of the engine 2 is transmitted in order of the first clutch 11, the first input shaft 21, the second input gear train 34, the second countershaft 25, the third-speed/fourth-speed output gear train 41, the second synchronization mechanism 70, and the output shaft 23, whereby the power transmission path of the third-speed stage is established.

Figure 6:
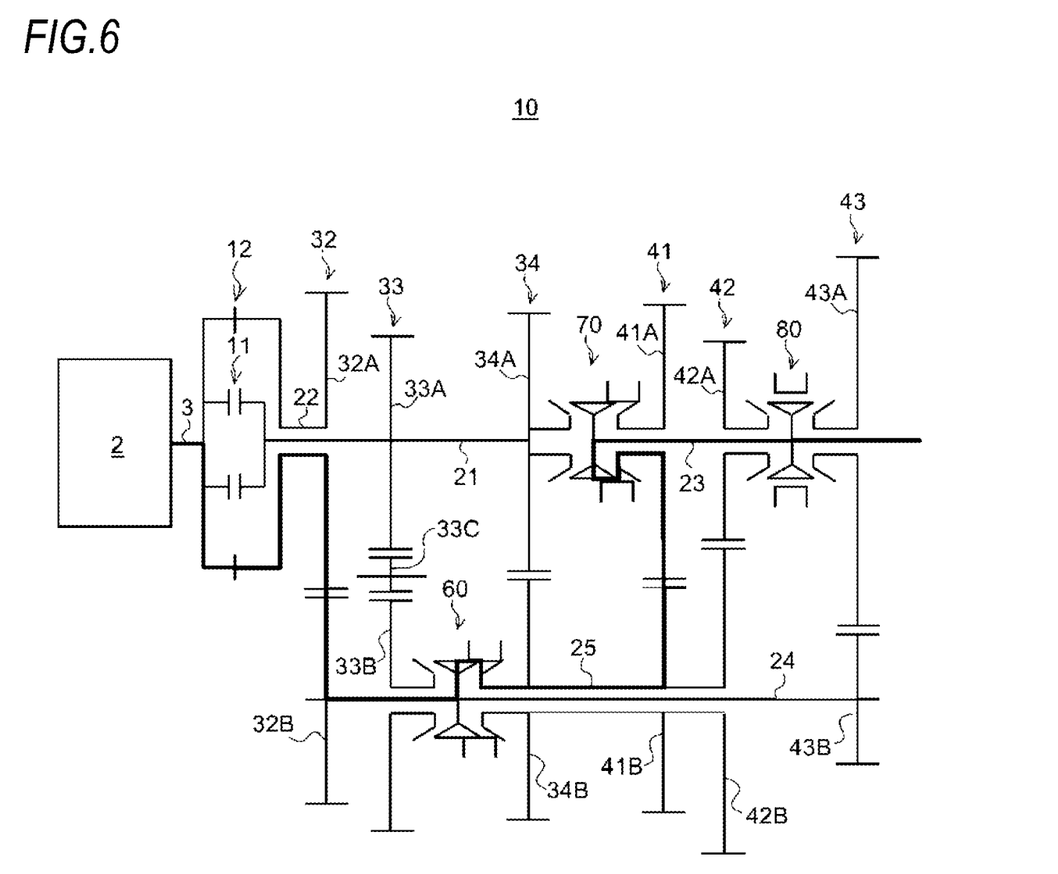
FIG. 6 is a diagram for illustrating a power transmission path at a fourth speed of the dual clutch-type transmission according to the embodiment.

FIG. 6 illustrates the power transmission path of the fourth-speed stage. The fourth speed is realized by switching the clutch connection from the first clutch 11 to the second clutch 12 in a third-speed state. That is, the power of the engine 2 is transmitted in order of the second clutch 12, the second input shaft 22, the first input gear train 32, the first countershaft 24, the first synchronization mechanism 60, the second countershaft 25, the third-speed/fourth-speed output gear train 41, the second synchronization mechanism 70, and the output shaft 23, whereby the power transmission path of the fourth-speed stage is established.

Figure 7:
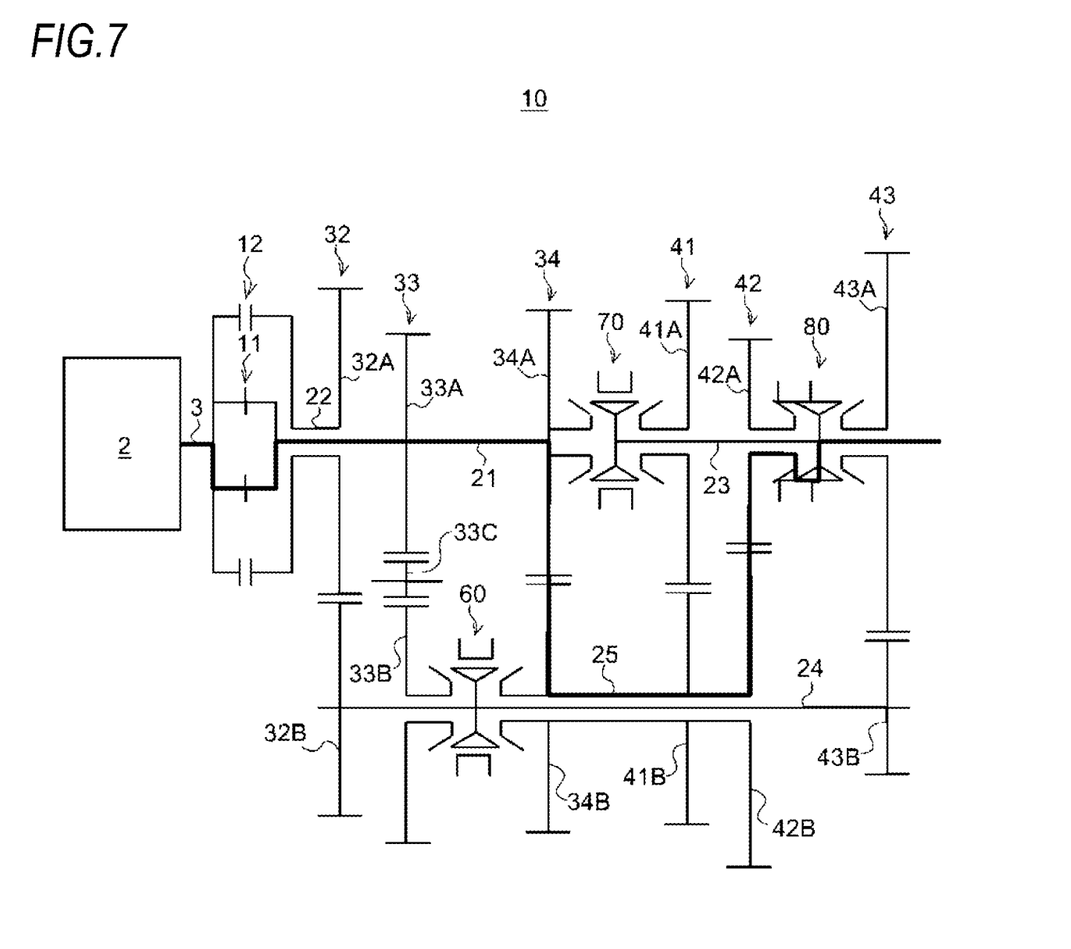
FIG. 7 is a diagram for illustrating a power transmission path at a fifth speed of the dual clutch-type transmission according to the embodiment.

FIG. 7 illustrates the power transmission path of the fifth-speed stage. In the case of the fifth speed, the second clutch 12 is disconnected from the fourth-speed state and the first clutch 11 is connected after the fifth-speed/sixth-speed output main gear 42A and the output shaft 23 are coupled by the third synchronization mechanism 80. That is, by normal Automated Manual Transmission (AMT) shifting where gear change is performed after clutch disengagement, the power of the engine 2 is transmitted in order of the first clutch 11, the first input shaft 21, the second input gear train 34, the second countershaft 25, the fifth-speed/sixth-speed output gear train 42, the third synchronization mechanism 80, and the output shaft 23, whereby the power transmission path of the fifth-speed stage is established. As described above, by applying the AMT shift to the middle-/high-speed stage range where the rotational speed difference is small, the deterioration in the driver's shift feeling is effectively reduced.

Figure 8:
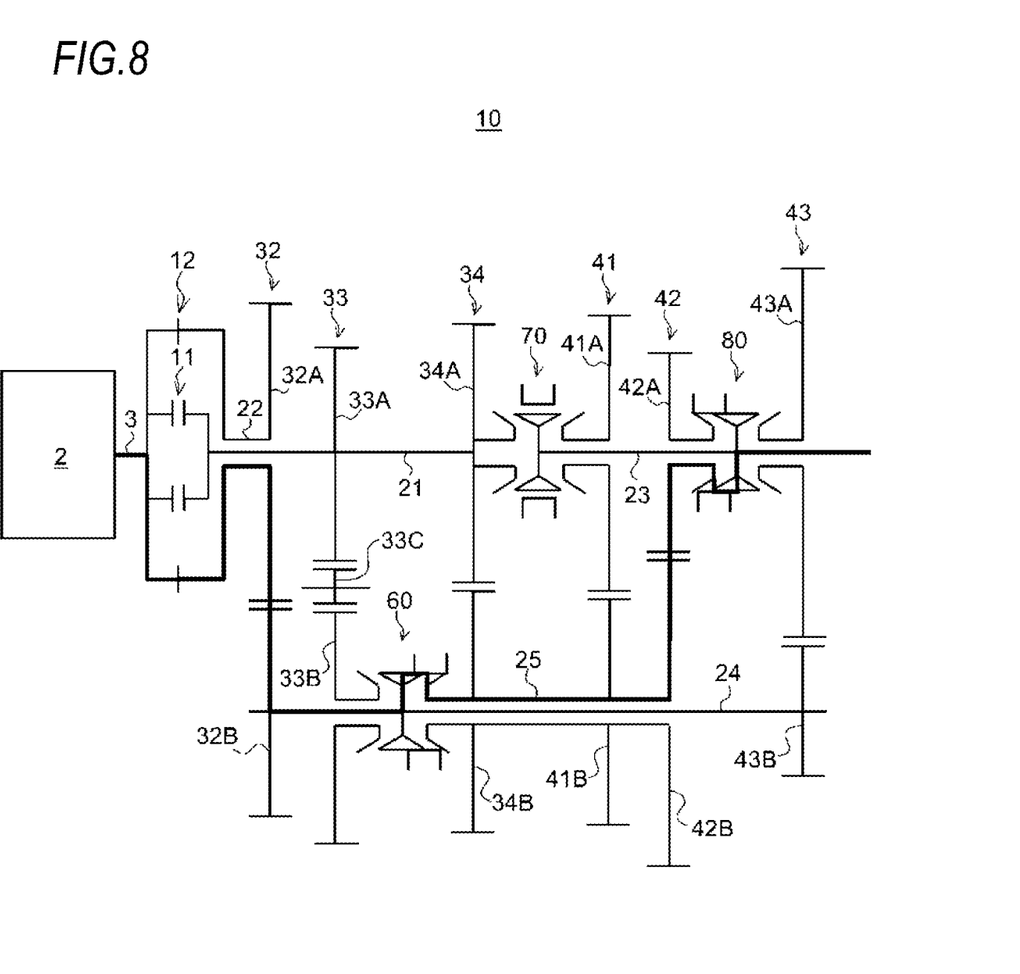
FIG. 8 is a diagram for illustrating a power transmission path at a sixth speed of the dual clutch-type transmission according to the embodiment.

FIG. 8 illustrates the power transmission path of the sixth-speed stage. The sixth speed is realized by switching the clutch connection from the first clutch 11 to the second clutch 12 in the fifth-speed state. That is, the power of the engine 2 is transmitted in order of the second clutch 12, the second input shaft 22, the first input gear train 32, the first countershaft 24, the first synchronization mechanism 60, the second countershaft 25, the fifth-speed/sixth-speed output gear train 42, the third synchronization mechanism 80, and the output shaft 23, whereby the power transmission path of the sixth-speed stage is established.

Figure 9:
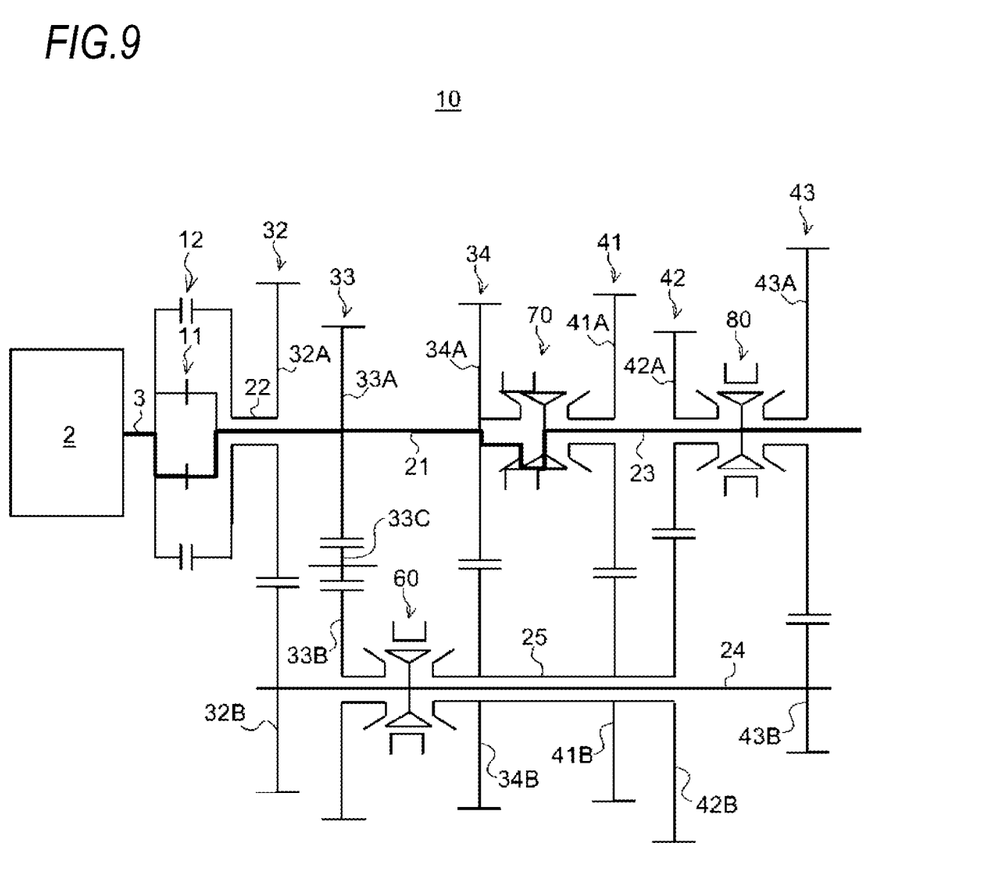
FIG. 9 is a diagram for illustrating a power transmission path at a seventh speed of the dual clutch-type transmission according to the embodiment.

FIG. 9 illustrates the power transmission path of the seventh-speed stage. In the case of the seventh speed, the second clutch 12 is disconnected from the sixth-speed state and the second input main gear 34A and the output shaft 23 are coupled (directly connected to the first input shaft 21) by the second synchronization mechanism 70, and then the first clutch 11 is connected. That is, by the normal AMT shifting where the gear change is performed after clutch disengagement, the power of engine 2 is transmitted in the order of the first clutch 11, the first input shaft 21, the second input main gear 34A, the second synchronization mechanism 70, and the output shaft 23, whereby the power transmission path of the seventh-speed stage is established. As described above, by applying the AMT shift to the high-speed stage range where the rotational speed difference is small, the deterioration in the driver's shift feeling is effectively reduced.

Figure 10:
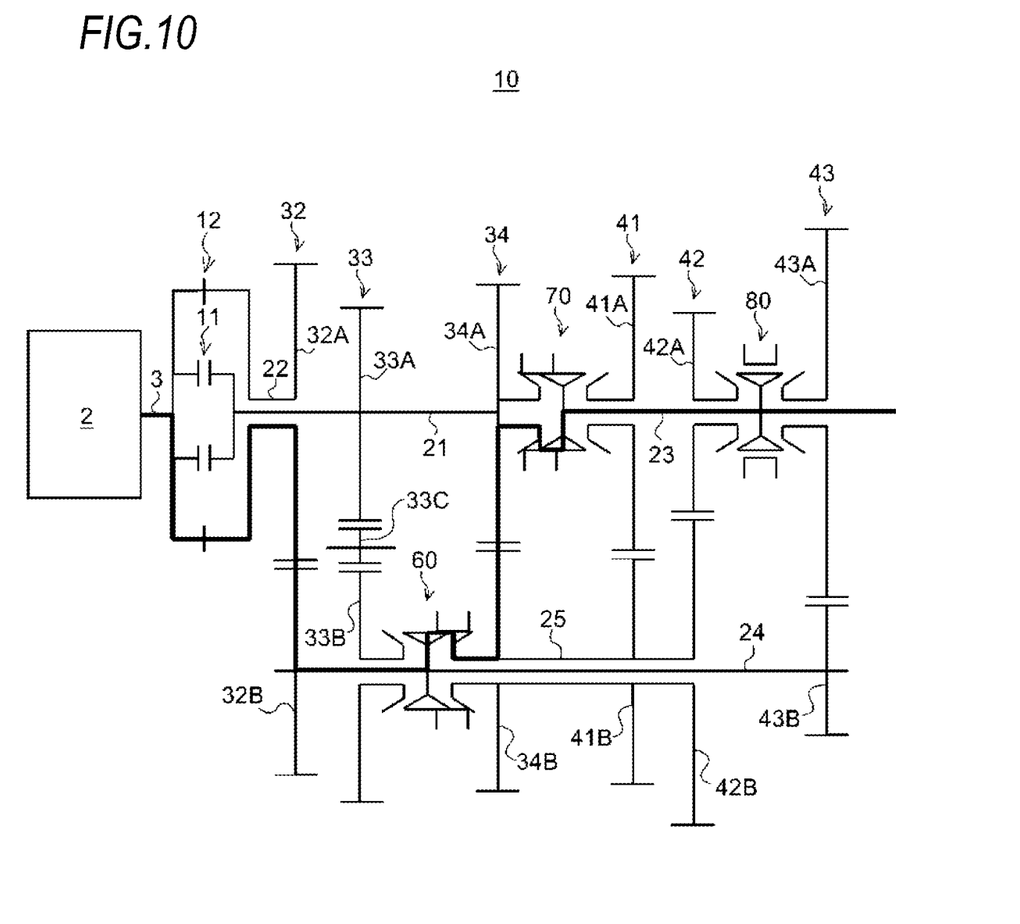
FIG. 10 is a diagram for illustrating a power transmission path at an eighth speed of the dual clutch-type transmission according to the embodiment.

FIG. 10 illustrates the power transmission path of the eighth-speed stage. The eighth speed is realized by coupling the second input counter gear 34B and the first countershaft 24 by the first synchronization mechanism 60 to pre-shift from the seventh-speed state to the eighth speed, and then switching the clutch connection from the first clutch 11 to the second clutch 12. That is, the power of the engine 2 is transmitted in order of the second clutch 12, the second input shaft 22, the first input gear train 32, the first countershaft 24, the first synchronization mechanism 60, the second input gear train 34, the second synchronization mechanism 70, and the output shaft 23. Therefore, by re-using the second input gear train 34 as the output gear train, the power transmission path of the eighth-speed stage is established.

As described above in detail, according to the dual clutch-type transmission 10 of the embodiment, two output counter gears 41B and 42B are provided on the second countershaft 25 which is relatively rotatable to the first countershaft 24 and one output main gear 43A is separately arranged on the output shaft 23 as an idle gear. Further, the ducal clutch-type transmission 10 is configured such that the eighth-speed stage re-uses the second input gear train 34 as the output gear train while the first/second, the third/fourth, the fifth/sixth stages are shared by the respective output gear trains 41 to 43. According to such a configuration, it is possible to achieve a multi-stage configuration of a total of eight speeds while saving the number of transmission gear trains and the number of synchronizing mechanisms.

In addition, by making all of the output main gears 41A to 43A which constantly mesh with the respective output counter gears 41B to 43B as idle gears capable of relative rotation with respect to the output shaft 23 and by eliminating the output counter gears 41B to 43B which are always accelerated with respect to the output shaft 23, stirring resistance, heat generation, wear, and an increase in drag loss can be effectively prevented.

In addition, the present disclosure is not limited to the embodiment described above and appropriate modifications can be made without departing from the spirit of the present disclosure.

For example, in the embodiment described above, the third-speed/fourth-speed output gear train 41 and the fifth-speed/sixth-speed output gear train 42 may be configured by exchanging the arrangement relationship thereof. Also, even in this case, the same operational effects as the embodiment described above can be achieved.

This application is based on Japanese Patent Application (No. 2016-225401) filed on Nov. 18, 2016, the contents of which are incorporated herein by reference.

INDUSTRIAL APPLICABILITY

According to the technology of the present disclosure, an increase in an overall length and weight of a transmission can be effectively prevented by achieving a multi-stage transmission configuration while saving the number of transmission gear trains.

REFERENCE SIGNS LIST 2 engine
10 dual clutch-type transmission
11 first clutch
12 second clutch
21 first input shaft
22 second input shaft
23 output shaft 24 first countershaft
25 second countershaft
30 primary transmission mechanism
32 first input gear train
33 reverse input gear train
34 second input gear train
40 secondary transmission mechanism
41 third-speed/fourth-speed output gear train
42 fifth-speed/sixth-speed output gear train
43 first-speed/second-speed/reverse output gear train
60 first synchronization mechanism
70 second synchronization mechanism
80 third synchronization mechanism

The invention claimed is:

1. A dual clutch-type transmission, comprising:
a first input shaft, which includes a first clutch to connect and disconnect power from a driving source;
a second input shaft, which includes a second clutch to connect and disconnect power from the driving source and has a hollow-shaft shape such that the first input shaft is rotatably inserted;
an output shaft, which is coaxially arranged with the first input shaft;
a first countershaft, which is arranged parallel to the first input shaft, the second input shaft and the output shaft;
a second countershaft, which has a hollow-shaft shape such that the first countershaft is rotatably inserted;
a first input gear train, which includes a first input main gear fixed to the second input shaft and a first input counter gear fixed to the first countershaft and meshing with the first input main gear;
a second input gear train, which includes a second input main gear fixed closer to the output side than the second input shaft in the first input shaft and a second input counter gear fixed to the second countershaft and meshing with the second input main gear;
a first output gear train, which includes a first output main gear rotatably provided on the output shaft and a first output counter gear fixed closer to the output side than the second input main gear in the second countershaft and meshing with the first output main gear;
a second output gear train, which includes a second output main gear rotatably provided closer to the output side than the first output main gear in the output shaft and a second output counter gear fixed closer to the output side than the first output counter gear in the second countershaft and meshing with the second output main gear;
a third output gear train, which includes a third output main gear rotatably provided closer to the output side than the second output main gear in the output shaft and a third output counter gear fixed closer to the output side than the second countershaft in the first countershaft and meshing with the third output main gear;
a first synchronization mechanism which selectively synchronously couples the second input counter gear with the first countershaft;
a second synchronization mechanism, which synchronously couples the second input main gear and the first output main gear with the output shaft, selectively; and
a third synchronization mechanism, which synchronously couples the second output main gear and the third output main gear with the output shaft, selectively, wherein
the power of the driving source is transmitted to the output shaft via the second clutch, the second input shaft, the first input gear train, the first countershaft, the first synchronization mechanism, the second input gear train, and the second synchronization mechanism at a predetermined maximum speed stage,
wherein the first output gear train, the second output gear train, and the third output gear train are shared as an output gear train of a predetermined speed stage and a speed stage which is one step higher than said speed stage, by switching the first clutch and the second clutch, and
wherein the dual clutch-type transmission further comprises:
a reverse input gear train including: a reverse input main gear fixed closer to the input side than the second input main gear in the first input shaft a reverse input counter gear that is rotatably provided between the first input counter gear of the first countershaft and the first synchronization mechanism and is synchronously coupled with the first countershaft, selectively, by the first synchronization mechanism; and an idler gear meshing with the reverse input main gear and the reverse input counter gear, wherein
in a reverse stage, the power of the drive source is transmitted to the output shaft via the first clutch, the first input shaft, the reverse input gear train, the first synchronization mechanism, the first countershaft, a third output gear train, and the third synchronization mechanism.

2. The dual clutch-type transmission according to claim 1, wherein
the predetermined maximum speed stage is an eighth speed, the third output gear train is an output gear train shared by a first speed and a second speed, the first output gear train is an output gear train shared by a third speed and a fourth speed, the second output gear train is an output gear train shared by a fifth speed and a sixth speed, and, in a seventh speed, the power of the driving source is transmitted to the output shaft via the first clutch, the first input shaft, the second input main gear, and the second synchronization mechanism.

* * * * *